Dec. 28, 1948.   G. T. McCLURE ET AL   2,457,584
CONTROL VALVE APPARATUS
Filed May 24, 1946   2 Sheets-Sheet 2

FIG. 2

INVENTOR.
GLENN T. McCLURE
JOHN W. RUSH
BY
*F. E. Miller.*
ATTORNEY

UNITED STATES PATENT OFFICE 2,457,584

CONTROL VALVE APPARATUS

Glenn T. McClure, McKeesport, and John W. Rush, Wilkinsburg, Pa., assignors to The Westinghouse Air Brake Company, Wilmerding, Pa., a corporation of Pennsylvania Application May 24, 1946, Serial No. 672,134

7 Claims. (Cl. 303—69)

This invention relates to control valve apparatus and has particular relation to control valve devices of the type adapted especially for use in fluid pressure brake control systems on railway cars and trains for controlling the release of fluid under pressure from the brake cylinder and the subsequent resupply of fluid under pressure to the brake cylinder upon the occurrence of a slipping condition of the wheels for the purpose of preventing the sliding of the car wheels.

Various types of control valve devices have been heretofore employed for effecting the release of fluid under pressure from a brake cylinder and the subsequent resupply of fluid under pressure to the brake cylinder in response to the occurrence of a slipping condition of the car wheels induced by an excessive degree of brake application. One type of such control valve device is disclosed and claimed in the prior copending application of Joseph C. McCune, now Patent 2,417,209, issued March 11, 1947, and assigned to the assignee of this application.

In the type of control valve device disclosed in the aforesaid patent, a pneumatic connection in the form of a flexible conduit or pipe is provided between the control valve device and a so-called "Decelostat" pilot valve carried in a casing attached to the outer end of the journal of a wheel axle whereby the control valve device is operatively controlled in response to the operation of the "Decelostat" pilot valve whenever a slipping condition of the vehicle wheel occurs.

The control valve device is automatically operated in response to the operation of the "Decelostat" pilot valve to effect reduction of the pressure in the brake cylinder to a predetermined low pressure and then restore it automatically within a certain normal interval of time. In the event that the "Decelostat" pilot valve pipe connecting the "Decelostat" pilot valve and the control valve device is ruptured, or in the event that the "Decelostat" pilot valve sticks open, the control valve device is operative automatically to cause destoration of the supply of fluid under pressure to the brake cylinder upon the elapse of an interval of time, thus insuring reapplication of the brakes notwithstanding the rupture of the pilot valve pipe or the sticking open of the "Decelostat" pilot valve.

Due to the specific construction of the control valve device in the aforesaid Patent 2,417,209, a certain interval of time is required to recharge the control valve device in order to render it responsive to a subsequent wheel slip operation. In the event that two wheel slip operations follow each other in close succession, the control valve device of the aforesaid patent may not be conditioned to respond promptly to effect a reduction of the brake cylinder pressure.

It is an object of our present invention to provide a control valve device having the same functions as the control valve device of the aforesaid patent but so constructed and arranged, in addition, as to respond instantaneously to successive and rapidly recurring wheel slip cycles.

In the aforesaid patent the time interval that elapses before resupply of fluid under pressure to the brake cylinder to effect reapplication of the brakes occurs following rupture of the pilot valve pipe or sticking open of the "Decelostat" pilot valve is, moreover, not uniform but varies in accordance with the degree of the pressure established in the brake cylinder.

It is another object of our present invention to provide a control valve device which is restored to the condition for resupplying fluid under pressure to the brake cylinder upon the elapse of a substantially uniform interval of time following rupture of the pilot valve pipe or sticking open of the Decelostat pilot valve, regardless of the degree of pressure established in the brake cylinder at the time rupture of the pilot valve pipe or sticking open of the pilot valve occurs.

The above objects, and other objects of our invention which will be made apparent hereinafter are attained by an embodiment thereof subsequently to be described and shown in the accompanying drawings, wherein.

Description

While our control valve device may be employed in various situations or types of mechanisms other than brake control apparatus, it is particularly designed for and useful in connection with fluid pressure brake control systems for railway cars and trains. By way of illustration, therefore, it is shown in Fig. 1 and will be described herein in connection with a brake control apparatus but it should be understood that it is not so limited in its utility.

Figure 1:
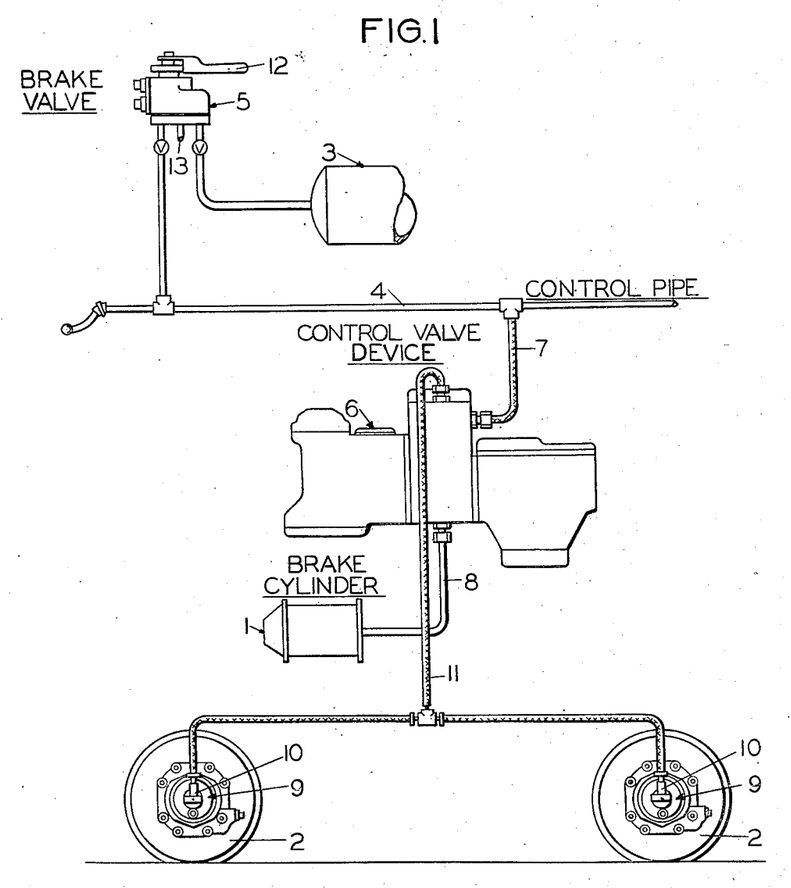
Fig. 1 is a simplified diagrammatic view of a fluid pressure brake control apparatus including our novel control valve device therein.

Referring to Figure 1, the brake system shown comprises a brake cylinder 1 operative, through the usual levers, upon the supply of fluid under pressure thereto to effect application of friction brakes (not shown) to the wheels 2 of a wheel truck. For simplicity, only two wheels 2 are shown, it being understood that each of the wheels 2 shown is one of a pair that may be fixed at opposite ends of a connecting axle.

The brake control equipment further comprises a source of fluid under pressure, such as a reservoir 3 which is normally charged as by a fluid compressor not shown; a control pipe 4; and manually controlled mechanism, typified in simplified form by a brake valve 5, for controlling the supply of fluid under pressure from the reservoir 3 to the pipe 4 and the release of fluid under pressure from the pipe 4. A control valve device 6, constructed according to our invention, is interposed between the control pipe 4 and the brake cylinder 1, connection being made from the control pipe 4 to the control valve device 6 through a branch pipe 7 of the control pipe and to the brake cylinder 1 through a so-called brake cylinder pipe 8. Associated with each of the wheel and axle units is a so-called "Decelostat" or wheel-slip detector 9, of the rotary inertia type, each "Decelostat" including a pilot valve device 10 carried on the outer end of the axle journal casing and connected to respective branches of a pipe, hereinafter called the pilot valve pipe 11, leading and connected to the control valve device 6.

Considering the parts of the equipment in greater detail, the brake valve 5 may be of the well-known self-lapping type, having an operating handle 12 secured to the outer end of a rotary operating shaft that is turned by rotation to control supply and release valve mechanism. In the normal or brake release position of the brake valve handle 12, fluid under pressure is vented to atmosphere from the control pipe 4 by way of the exhaust port and pipe 13 at the brake valve. When the brake valve handle 12 is shifted out of its brake release position into its application zone, the exhaust connection of the control pipe 4 is closed and a supply connection is opened between the reservoir 3 and the control pipe 4. The nature of the brake valve mechanism is such that the supply of fluid under pressure to the control pipe 4 is automatically terminated when a certain pressure is established therein corresponding substantially to the degree of displacement of the brake valve handle 12 out of its brake release position. Thus, the greater the degree of displacement of the brake valve handle out of brake release position, the greater is the pressure established in the control pipe 4. The brake valve 5 also has a pressure-maintaining feature in that should the pressure in the control pipe tend to reduce from that corresponding to the degree of displacement of the brake valve handle out of its brake release position, the supply valve of the brake valve is automatically operated to cause fluid under pressure to be supplied to the control pipe to maintain a pressure therein corresponding to the position of the brake valve handle.

Under normal conditions, communication is established in the manner more fully described hereinafter, through the control valve device 6 between the branch pipe 7 of the control pipe and the brake cylinder pipe 8 so that a fluid pressure is established in the brake cylinder corresponding to the pressure established in the control pipe 4, thereby causing an application of the brakes on the car wheels 2 to a degree corresponding to the pressure established in the control pipe 4.

Figure 2:
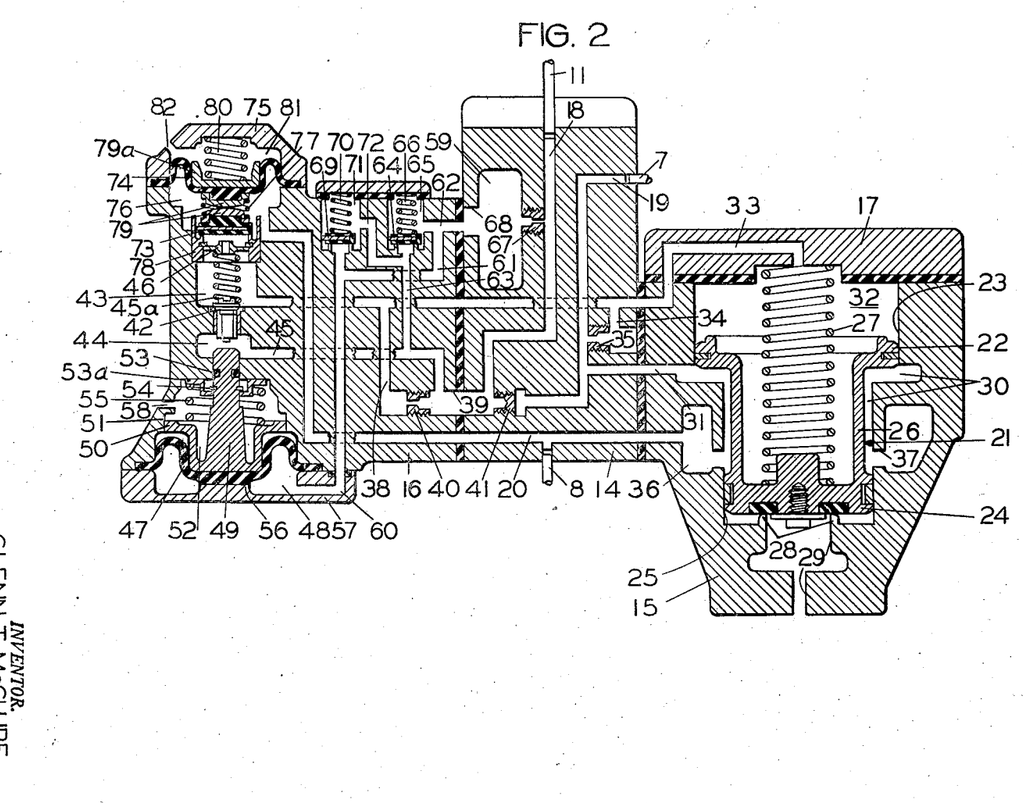
Fig. 2 is an enlarged vertical sectional view, with parts in one plane for clarity, showing the detailed construction of our novel and improved control valve device.

The control valve device 6 comprises a sectionalized casing including a pipe bracket and mounting portion 14 having two substantially parallel faces on opposite sides thereof, to one of which faces a vent valve portion 15 is attached as by screws or bolts not shown, with a suitable sealing gasket intervening, and to the other face of which an auxiliary portion 16 is attached as by screws or bolts not shown, with a suitable sealing gasket intervening. The vent valve portion 15 has a cap portion 17 attached thereto as by screws or bolts not shown, with a suitable sealing gasket intervening.

The pipe bracket portion 14 is provided with three passages 18, 19 and 20 out of which open ports to which the pilot valve pipe 11, the branch pipe 7 of the control pipe, and the brake cylinder pipe 8 are respectively connected.

Embodied in the vent valve portion 15 is a differential piston valve device 21 comprising an annular piston 22 operative in a circular bore 23, and a disc type piston valve 24 of smaller diameter, operative in a bore 25 of correspondingly smaller diameter, the two bores being coaxially related and the piston 22 and piston valve 24 being connected by a tubular stem 26.

A coil spring 27 extends through the stem 26, in interposed relation between the inner face of the cap section 17 and the inner face of the piston valve 24, and yieldingly urges the differential piston valve device 21 downwardly to a position in which the piston valve 24 seats on a seat rib 28 that surrounds a vent port 29.

Formed in surrounding relation to the stem 26 is an annular chamber 30 that is open to the inner face of the annular piston 22 and is connected by a branch passage 31 to the passage 19 within the pipe bracket portion 14.

The chamber 32 formed within the bore 23 at the outer face of the annular piston 22 is also connected to the passage 19 through a passage 33, a branch passage 34, and a choke-fitting 35 of the screw type interposed in a bore connecting the branch passage 34 and the passage 19. The bore containing the choke-fitting 35 is open to the face of the pipe bracket portion 14 to enable installation and removal of the choke-fitting while the vent valve portion 15 is removed from that face.

Also formed in the vent valve portion 15 is an annular chamber 36 that communicates with the annular chamber 30 through a series of circularly arranged peripherally spaced ports 37. The passage 20 in the pipe bracket portion 14 leads to and opens into the chamber 36.

The passage 33 extends into the auxiliary portion 16, and a branch passage 38 thereof leads to a bore or passage 39 that opens at the face of the auxiliary portion 16 and registers with a corresponding portion of the bore 39 in the pipe bracket portion 14. Located in the bore 39 is a screw-type choke-fitting 40 adapted to be installed and removed through the open end of the bore 39 while the auxiliary portion 16 is removed from the pipe bracket portion 14.

The passage 18, to which the pilot valve pipe 11 is connected, leads to and opens into the portion of the bore 39 in the auxiliary portion 14. The passage 19, to which the branch pipe 7 is connected, also opens into the bore 39 but the connection is closed by means of a screw plug 41 installed through the open end of the bore 39 while the auxiliary portion 16 is removed. The connection between the passage 19 and the bore 39 may be omitted if desired for it has no utility in the control valve device as shown.

It will accordingly be seen that when fluid under pressure is supplied from the control pipe 4 through the pipe 7 to the passage 19, fluid under pressure is supplied through the orifice of the choke-fitting 35, branch passage 34, passage 33, branch passage 38 and the orifice of the choke-fitting 40 to the passage 18 and the connected pilot valve pipe 11.

Embodied in the auxiliary portion 16 is a valve 42 of the poppet type adapted to control a connection between the passage 33 and the pilot valve pipe 11 in a manner to enable rapid charging thereof in by-passing relation to the choke-fitting 40. To this end, the poppet valve 42 is guided by means of a fluted stem in a bore connecting a first chamber 43, into which the passage 33 opens, and a second chamber 44 out of which a passage 45 leads that is connected into the bore 39 outside the choke-fitting 40.

A coil spring 45a, interposed between a suitable perforated collar 46 and the valve 42, yieldingly biases the valve to seated position.

Associated with the valve 42 is a flexible diaphragm 47 having a chamber 48 at one side thereof to which fluid under pressure is supplied, in the manner presently to be described, for exerting a force upwardly on the diaphragm and through a suitable follower 49 to effect unseating of the valve 42. The follower 49 has a cup-shaped annular flange 50 guided in a suitable bore 51 and a central stem portion which extends slidably through a circular bore connecting the chamber 44 to a chamber 52 at the upper side of the diaphragm 47 which is maintained at atmospheric pressure through a vent port 58. A suitable sealing or grommet ring 53 of rubber or rubber composition, contained in an annular groove on the stem of the follower 49, provides a suitable seal to prevent leakage of fluid under pressure from the chamber 44 along the stem of the follower to the atmospheric chamber 52.

Surrounding the stem of the follower 49 is a cup-shaped washer 53a conveniently retained on the stem of the follower when the follower is removed from the casing or auxiliary portion 16, as by a snap ring 54. Interposed between one side of the washer 53a, which seats against a suitable surface of the casing, and the follower 49 is a coil spring 55 that yieldingly urges the follower and diaphragm 47 downwardly to a position in which the central part of the diaphragm engages a boss or stop 56 formed on a cover plate 57. Cover plate 57 is secured to the portion 16 by screws or bolts not shown and clamps the diaphragm 47 in position.

The strength of the springs 45a and 55 is such that whenever the pressure of the fluid in chamber 48 exceeds a value of approximately five pounds per square inch, the follower 49 is shifted upwardly to engage the end of the fluted stem of the valve 42 and effect unseating of the valve 42. With the valve 42 unseated, the pilot valve pipe 11 and the chamber 32 of the vent valve portion are in constant communication in by-passing relation to the choke-fitting 40 by way of the passage 18, bore 39, passage 45, past the unseated valve 42 and passage 33.

The chamber 48 at one side of the diaphragm 47 is connected to a so-called timing volume 59, formed in the pipe bracket portion 14, by a passage 60, a branch passage 61, and a passage 62 that leads into the volume 59.

Whenever fluid under pressure is supplied to charge the pilot valve pipe 11, fluid under pressure is concurrently supplied to charge the chambers 48 and 59 by way of a branch passage 63 of the passage 45, past a one-way or check valve 64 of the disc type, to a chamber 65 to which the passage 62 is connected. The check valve 64 is yieldingly biased to a seated position by a coil spring 66 of such a strength as to load the check valve to a value of about four or five pounds per square inch.

The timing volume 59 is connected to the passage 18 through a suitable bore containing a choke-fitting 67. Choke-fitting 67 may be of the screw type and is adapted to be installed and removed, as through a port 68 in the outer wall of portion 14 and aligned with the bore that receives the choke-fitting while the auxiliary portion 16 is removed. Port 68 preferably registers with passage 62 in the auxiliary portion 16 as shown to provide a connection between passage 62 and volume 59.

Due to the fact that the check valve 64 unseats at a relatively low pressure of four or five pounds per square inch, the timing volume 59 and the chamber 48 are charged at a rapid rate upon the supply of fluid under pressure from the branch pipe 7 of the control pipe into the passage 19 rather than at the relatively restricted rate through the orifice of the choke-fitting 67.

There is also provided in the auxiliary portion 16 another one-way or check valve 69 of the disc type, similar to the check valve 64. The check valve 69 is loaded by a coil spring 70 having such strength as to require twenty-five pounds per square inch fluid pressure to effect unseating of the valve. The check valve 69 is adapted to seat on an annular seat rib surrounding a port opening out of the passage 60. A chamber 71 at the outer face of the check valve 69 is connected by a passage 72 to the passage 63.

It will be apparent, therefore, that assuming the timing volume 59, the pilot valve pipe 11 and passage 18 to be charged to the same pressure, a twenty-five pound reduction of the pressure in the pilot valve pipe with respect to the pressure in the volume 59 will cause unseating of the check valve 69 to effect a reduction of the pressure in the timing volume 59 and the connected chamber 48 at a rapid rate in accordance with the rapid rate of reduction in the pilot valve pipe 11 until the pressure in the timing volume 59 and chamber 48 reduces to below a pressure of twenty-five pounds per square inch. When the pressure in the timing volume 59 and the connected chamber 48 reduces to below twenty-five pounds per square inch, the loading spring 70 will seat the check valve 69 to prevent the further escape of fluid under pressure past the check valve 69 from the chambers 48 and 59. With check valve 69 seated, fluid under pressure escapes from the chambers 48 and 59 only through the orifice of the choke-fitting 67. The timing arrangement thus provided is such that the restricted flow of fluid under pressure through the orifice of the choke-fitting 67 is effected or initiated in every instance from a uniform pressure of twenty-five pounds per square inch in the timing volume 59.

Also embodied in the auxiliary portion 16 is a disc valve 73, hereinafter referred to as the cut-off valve. The cut-off valve 73 is under the control of a diaphragm 74 which is secured in position by a cover plate 75 suitably attached to the auxiliary portion 16. Interposed between the diaphragm 74 and the valve 73 in a chamber 76 is a coil spring 77 of relatively light strength for yieldingly biasing the valve to a seated position on an annular rib seat formed on a bushing 78 that is suitably secured in the auxiliary portion 16. Rounded contact pieces 79 of suitable material, such as "Micarta" or "Bakelite" are bonded or otherwise suitably attached to the valve 73 and the diaphragm 74 to enable direct application of force from the diaphragm to the valve. Interposed between a follower 79a, suitably attached to the outer face of the diaphragm 74, and the cover plate 75 is a relatively heavy coil spring 80 which is effective, through the diaphragm 74, to exert a force to seat the cut-off valve 73. The chamber 81 at the outside of the diaphragm 74 is constantly open to atmosphere through a port 82.

The spring 80 is so designed that a fluid pressure of the order of twenty-five pounds per square inch in the chamber 76 at the lower side of the diaphragm is effective to overcome the force of the spring and shift the diaphragm upwardly to relieve the cut-off valve 73 of the force of the spring 80 resisting unseating of the cut-off valve. Conversely, when the pressure of the fluid in the chamber 76 beneath the diaphragm 74 reduces to below twenty-five pounds per square inch the spring 80 is effective to exert a force to maintain the cut-off valve 73 seated.

The cut-off valve 73 is effective when unseated upwardly to permit the flow of fluid under pressure therepast from the chamber 43 to the chamber 76 to which the passage 20 is connected. It will be seen, therefore, that since the pressure in the chamber 76 corresponds to the pressure in the brake cylinder by reason of the connection established through the passage 20, fluid under pressure will be vented from the chamber 32 of the vent valve portion 15 by way of the passage 33, chamber 43, past the cut-off valve 73, chamber 76, passage 20, annular chamber 36, ports 37 and exhaust port 29 of the vent valve portion 15 whenever the differential piston valve device 21 of the vent valve portion is actuated upwardly to its operated position in the manner presently to be described. It will also be apparent that when the pressure in the brake cylinder reduces to a value below twenty-five pounds per square inch, the spring 80 becomes effective to seat the cut-off valve 73 to prevent the venting of the chamber 32 of the vent valve portion past the cut-off valve and through the exhaust port 29 of the vent valve portion.

The "Decelostats" or wheel-slip detectors 9 may be of the rotary inertia type disclosed in the copending application, Serial No. 533,284 of Joseph C. McCune and George K. Newell, filed April 29, 1944, now Patent No. 2,447,710, granted August 24, 1948, and assigned to the assignee of the present application. Since reference may be had to this copending application for details of the "Decelostat," it is deemed unnecessary to further describe these devices other than to point out that they comprise essentially a fly-wheel element which is operative in response to acceleration or deceleration of the wheel and axle units at a rate exceeding a certain rate, such as ten miles per hour per second, which occurs only when the associated wheel 2 slips, to effect unseating of the pilot valve devices 10.

The term "slip" as used herein refers to the rotation of a vehicle wheel at a speed different from that corresponding to vehicle or rail speed at a given instant and may be induced either by excessive propulsion torque or excessive braking torque exerted on the wheel. When excessive braking torque is exerted on a wheel, it decelerates at an abnormally rapid rate in excess of ten miles per hour per second, which rate of deceleration is never attained unless the wheels are actually slipping.

The term "slide" as employed herein in connection with vehicle wheels refers to a non-rotative or locked condition of the wheels as distinct from a "slip" condition in which the wheels are rotating. It will be understood, therefore, that whenever a vehicle wheel 2 begins to slip, the corresponding pilot valve device 10 is unseated to effect a rapid venting to atmosphere and a consequent reduction of the pressure in the pilot valve pipe 11 and the connected chamber 32 of the vent valve portion of the control valve device 6. This initiates a sequence of operation which will be presently explained.

Operation

In order to further explain the operation of the control valve device 6, let it be assumed that the operator desires to initiate a brake application while the vehicle having the equipment shown in Figure 1 is traveling under power. After first shutting off propulsion power, the operator shifts the brake valve handle 12 out of its brake release position a desired amount into the brake application zone to cause a fluid pressure to be established in the control pipe 4 corresponding to the desired degree of brake application. With the control pipe 4 charged with fluid under pressure, fluid under pressure flows through the branch pipe 7, passage 19, branch passage 31, annular chamber 30, ports 35, annular chamber 36, passage 20, and pipe 8 to the brake cylinder 1, the pressure established in the brake cylinder corresponding to that established in the control pipe 4.

The piston valve device 21 remains seated in the position in which it is shown in Figure 2 while fluid under pressure is being supplied to the brake cylinder as just described, by reason of the sufficiently rapid flow of fluid under pressure through the orifice of the choke-fitting 35 to chamber 32 above the piston valve device 21, the build-up of the pressure in the chamber 32 being sufficiently rapid to prevent the development of a differential fluid pressure force on the piston valve device 21 sufficient to overcome the downwardly exerted force of the spring 27.

The chamber 76 in the auxiliary portion of the control valve mechanism 6 is concurrently charged with fluid at the pressure established in the brake cylinder by flow of fluid under pressure through the passage 20 to the chamber 76, the force of the spring 80 acting to hold the cut-off valve 73 seated being removed when the brake cylinder pressure exceeds twenty-five pounds per square inch.

Fluid under pressure supplied to the passage 19 also flows through the orifice of the choke-fitting 35, branch passage 34, passage 33, branch passage 38, the orifice of the choke-fitting 40, bore 39 and passage 18 to the pilot valve pipe 11, thereby charging the pilot valve pipe to the pressure established in the brake cylinder. Concurrently with the charging of the pilot valve pipe, fluid under pressure flows from the bore 39 by way of the passage 45, branch passage 63, past the check valve 64, through the passage 62 to charge the timing volume 59 at a rapid rate. At the same time, the chamber 48 beneath the diaphragm 47 is charged to the pressure established in the timing volume 59 through the branch passage 61 and the passage 60.

When the pressure established in the timing volume 59 and the chamber 48 exceeds a relatively low value such as four or five pounds per square inch, the upwardly exerted force on the diaphragm 47 is transmitted through the stem of the follower 49 to unseat the poppet valve 42. Thereafter, fluid under pressure is supplied to charge the pilot valve pipe, the timing volume 59, and the chamber 48, in by-passing relation to the choke-fitting 40, by flow from the passage 33 past the unseated valve 42, chamber 44, passage 45, bore 39, and passage 18 to the pilot valve pipe 11.

It will thus be apparent that rapid charging of the pilot valve pipe, timing volume 59 and the chamber 48 is effected at the time that fluid under pressure is supplied to the brake cylinder 1.

So long as the wheels 2 do not begin to slip due to the brake application, no further operation of the control valve device 6 occurs. Moreover, pressure in the brake cylinder may be varied, up or down, in correspondence with variations in the pressure in the control pipe 4 to either increase or decrease the degree of brake application on the wheels 2.

Should one of the wheels 2 begin to slip at the time a brake application is initiated or during a brake application, automatic operation of the control valve device 6 is effected in the manner which will now be described. The unseating of the pilot valve device 10 of the "Decelostat" 9 associated with the slipping wheel unit effects a rapid venting of the fluid pressure in chamber 32 above the piston valve device 21 of the vent valve portion 15 by way of the passage 33, past the unseated valve 42, passage 45, bore 39, passage 18, and pilot valve pipe 11. Due to the restriction of the orifice in the choke-fitting 35, the pressure in the annular chamber 30 beneath the piston 22 cannot reduce as rapidly through the choke-fitting to the passage 33 as the pressure in the chamber 32. Accordingly, sufficient differential fluid pressure is promptly built-up on the piston valve device 21 to overcome the downward force of spring 27 and to cause shifting of the piston valve device 21 upwardly into contact with the inner face of the cap portion 17.

In its operated position above the ports 37 to which it is moved as just described, the piston valve 24 closes off the connection between the passage 19 and the passage 20. At the same time, with the piston valve 24 above the ports 37, the passage 20 and the brake cylinder 1 are connected to atmosphere through the exhaust port 29 of the vent valve portion 15, reduction of the pressure in the brake cylinder being thus effected at a rapid rate.

Once the piston valve device 21 is operated to its upper position to vent fluid under pressure from the brake cylinder, fluid under pressure is automatically vented from the chamber 32 of the vent valve portion 15 at a rapid rate by way of the passage 33, past the cut-off valve 73 which unseats against the relatively light resisting force of spring 77, passage 20, annular chamber 36, ports 37, and exhaust port 29. It will be seen, therefore, that the unseating of the "Decelostat" pilot valve devices 10 merely initiates the operation of the piston valve device 21 to its operative position, the piston valve device 21 being maintained in its operative position thereafter independently of further venting of fluid under pressure from the pilot valve pipe 11 by the "Decelo-stat" pilot valve 10, by reason of the self-venting operation of the piston valve device 21 through the exhaust port 29.

The reduction of the pressure in the timing volume 59 and the chamber 48 lags behind the reduction of the pressure in the pilot valve pipe 11 by reason of the restricted orifice in the choke-fitting 67. At the same time, however, the pressure in the chamber 71 at one side of check valve 69 reduces at a rapid rate by reason of the unrestricted communication with the pilot valve pipe passage 18 through passages 72, 63, 45 and 39. A sufficient differential fluid pressure force is thus promptly built-up to effect the unseating of the check valve 69 upwardly and the consequent reduction of fluid under pressure in the timing volume 59 and the connected chamber 48 at a rapid rate concurrently with the reduction of the pressure in the pilot valve pipe 11 and the chamber 32 of the vent valve portion 15 by flow past the unseated valve 42, past the cut-off valve 73, through the passage 20 to atmosphere through the exhaust port 29 of the vent valve portion 15. Such rapid reduction of the fluid pressure in volume 59 and chamber 48 continues until such time as the pressure in the volume 59 and chamber 48 reduces to below twenty-five pounds per square inch. When the pressure in the volume 59 and the chamber 48 reduces to below twenty-five pounds per square inch, check valve 69 will be seated by the force of the loading spring 70 and no further reduction of pressure in these chambers will occur past the check valve 69 but will occur solely by reason of flow through the restricted orifice of the choke-fitting 67. A pneumatic timing operation is accordingly initiated uniformly following the instant that the pressure in the timing volume 59 reduces to a pressure of twenty-five pounds per square inch. Thus a uniform timing interval, substantially unaffected by the degree of brake cylinder pressure established, is provided for a purpose hereinafter to be explained.

Due to the rapid and prompt reduction of the pressure in the brake cylinder following upon the occurrence of the slipping condition of the wheel unit, the slipping wheel unit promptly ceases to decelerate and begins to accelerate back toward a speed corresponding to vehicle or rail speed. The "Decelostat" pilot valve 10 associated with the slipping wheel unit is restored to closed position terminating further venting thereby of the pilot valve pipe 11 when the rate at which the slipping wheel unit accelerates back toward vehicle speed reduces below a value of approximately ten miles per hour per second. Ordinarily, the pilot valve device 10 will be reclosed while the reduction of the pressure in the chamber 32 of the vent valve portion 15 is still continuing by self-venting through the exhaust port 29.

When the pressure in the brake cylinder 1 reduces below a value of approximately twenty-five pounds per square inch, insufficient force is exerted on the diaphragm 74 to compress the spring 80. The spring 80 accordingly becomes effective to exert a force downwardly to seat the cut-off valve 73 which thus prevents further venting of fluid under pressure from the chamber 32 of the vent valve portion 15 therepast. With the pilot valve device 10 reseated, therefore, the reseating of the cut-off valve 73 will effect termination of the further venting of fluid under pressure from the chamber 32 of the vent valve portion 15. Consequently, due to the prompt build-up of pressure in the chamber 32 through the orifice of the choke fitting 35 the fluid pressure differential active to maintain the piston valve device 21 in its upper or operated position is sufficiently and promptly reduced so as to enable the spring 27 to promptly restore the piston valve device 21 downwardly to its seated position in which it is shown in Figure 2. Actually, due to the slight operational lag of the piston valve device 21, the pressure in the brake cylinder may reduce to as low as five pounds per square inch before the restoration of piston valve device 21 to its normal position and the consequent termination of further venting of fluid under pressure from the brake cylinder occurs.

With the piston valve device 21 restored to its normal position as just described, the communication is again established through which fluid under pressure is supplied from the control pipe 4 to the brake cylinder 1, thereby effecting a reapplication of the brakes to a degree corresponding to the pressure established in the control pipe 4.

At the same time that fluid under pressure is resupplied to the brake cylinder, the timing volume 59 and the connected chamber 48 are again rapidly recharged, in the manner previously described, by flow of fluid under pressure past the check valve 64. It should be understood, that by reason of the fact that the reduction of the pressure in the timing volume 59 lags behind the reduction of the pressure in the brake cylinder, the piston valve device 21 of the vent valve portion 15 will have been restored to its normal position, in the manner just described, before the pressure in the timing volume 59 and connected chamber 48 reduces to a low value of four or five pounds per square inch. Sufficient pressure therefore remains in the timing volume 59 and in the connected chamber 48 under normal conditions to maintain the valve 42 unseated. Consequently, upon the resupply of fluid under pressure to the brake cylinder, recharging of the timing volume 59 and chamber 48 is rapidly effected by flow of fluid under pressure from the passage 33 past the valve 42 and by way of the chamber 44, passage 45, branch passage 63, and thence past the check valve 64. Thus, there is no delay in the recharging of the timing volume 59 and the chamber 48. At the same time due to the fact that the valve 42 remains unseated, the piston valve device 21 of the vent valve portion 15 may be instantly responsive to a possible subsequent operation of the pilot valve device 10 of a "Decelostat" 9 resulting from an immediately recurring slipping condition of the wheel following upon reapplication of the brakes.

Should the same wheel unit which previously slipped, or another wheel unit of the same truck, begin to slip substantially at the time that reapplication of the brakes is being effected, the piston valve device 21 of the vent valve portion 15 will immediately respond to the unseating of the pilot valve device 10 to again effect reduction of the pressure in the brake cylinder 1 followed by the automatic restoration of the piston valve device 21 to resupply fluid under pressure to the brake cylinder in the manner previously described.

It will thus be seen that our improved control valve device 6 is specifically constructed and operative to respond instantaneously to rapidly repeated and recurring wheel slip cycles, a characteristic not present or existent in previous control valve devices of this type.

When the vehicle comes to a stop in response to a brake application, the piston valve device 21 of the vent valve portion 15 will have been restored to its normal position. Thus fluid under pressure will be supplied to the brake cylinder 1 to maintain the brake application effective while the vehicle is stopped so long as pressure exists in the control pipe 4. Moreover, since there is no danger of wheel slip occurring while the vehicle is stopped, the degree of brake application may be increased to any desired degree required to hold the vehicle on a grade.

When the operator again desires to proceed, he may release the brakes merely by restoring the brake valve handle 12 to its brake release position, thus reducing the pressure in the control pipe 4 and, correspondingly, that in the brake cylinder 1 to atmospheric pressure.

Thus far a normal operation of the pilot valve device 10 and continuity or integrity of the pilot valve pipe 11 has been assumed. In the event, however, that a pilot valve device 10 operates improperly and sticks in open position once it is operated, or in the event that the pilot valve pipe 11 is accidentally ruptured or broken, our control valve device is operative automatically to insure reapplication of the brakes.

If, therefore, the pilot valve device 10 sticks in open position so as to continue the venting of fluid under pressure from the pilot valve pipe 11, the following operation occurs. Let it be assumed that the control valve device 6 is operated in the manner previously described to effect the reduction of the pressure in the brake cylinder following upon the initial operation of the "Decelostat" pilot valve device 10 and that the pressure in the brake cylinder has reduced to below twenty-five pounds per square inch to effect reseating of the cut-off valve 73. With the pilot valve device 10 stuck open and continuing to vent the pilot valve pipe 11, the differential piston valve device 21 of the vent valve portion 15 will not be instantaneously restored to its normal position upon reseating of the cut-off valve 73, by reason of the continuing reduction of the pressure in the chamber 32 by flow from the passage 33 past the unseated valve 42, passage 45, bore 39, passage 18 and pilot valve pipe 11. However, after a predetermined uniform interval of time, approximately three seconds, following the reduction of the pressure in the timing volume 59 to twenty-five pounds per square inch, the pressure in the timing volume 59 and the connected chamber 48 will have reduced through the orifice of the choke-fitting 67 to a value below four or five pounds per square inch. In such case, therefore, the spring 55 becomes effective to shift the diaphragm 47 and the follower 49 downwardly, thereby causing the valve 42 to be instantly seated by the spring 45.

With the valve 42 thus seated, the further venting of fluid under pressure from the chamber 32 of the vent valve portion 15 is terminated notwithstanding the continued venting of the pilot valve pipe 11 by the "Decelostat" pilot valve 10 which is stuck in open position. The differential piston valve device 21 will thus be promptly restored to its normal position due to the prompt build-up of the pressure in the chamber 32 through the orifice of the choke-fitting 35.

It will be seen, therefore, that if the differential piston valve device 21 is not operated to its normal position restoring the supply communication to the brake cylinder in its normal manner, it will be restored thereto at all events by reason of the pneumatic timing arrangement provided in our control valve device 6. It will be observed that the timing interval is substantially uniform regardless of the pressure established in the brake cylinder, a characteristic not present in previously known control valve devices of this type.

With the "Decelostat" pilot valve device 10 stuck in open position, it will be seen that the brakes may be applied and released in normal manner once the differential piston valve device 21 has been restored to its normal position in response to the pneumatic timing operation. However, due to the fact that charging of the pilot valve pipe 11 and of the timing volume 59 and its connected chamber 43 cannot be effected so long as the pilot valve is vented by the "Decelostat" pilot valve stuck in open position, it will be understood that the valve 42 will remain in its seated position due to the fact that a pressure in excess of four or five pounds per square inch cannot be built-up in the chamber 48 sufficient to unseat the valve 42. Thus it will be apparent that while the brakes may be applied and released in normal manner under the control of the operator, the anti-wheel sliding protection feature of the control valve mechanism will be lost so long as the "Decelostat" pilot valve device 10 is stuck in open position. It will also be apparent that during a brake application, fluid under pressure will flow at a restricted rate through choke fitting 40 to the pilot valve pipe 11 causing a continuous blow at the pilot valve 10 that is stuck open. The amount of fluid under pressure escaping through choke 40 is however limited and may be tolerated in an emergency.

A situation similar to that which occurs when a "Decelostat" pilot valve device 10 sticks in open position occurs when the pilot valve pipe 11 itself is ruptured or broken, for some accidental reason, as by striking an object along the right of way. Obviously, if the pilot valve pipe 11 is broken while the brakes are released, application and release of the brakes under the control of the operator may be effected in the same manner as if the "Decelostat" pilot valve device 10 were stuck in open position, the anti-wheel sliding protective feature of the control valve device 6 being lost.

In the event that the pilot valve pipe 11 becomes ruptured while a brake application is in effect on the vehicle, it will be seen that the differential piston valve device 21 will be operated to effect a reduction of brake cylinder pressure in the same manner as if the "Decelostat" pilot valve device 10 had initiated the operation in normal manner in response to the occurrence of a wheel slip condition.

By reason of the pneumatic timing arrangement, the differential piston valve device 21 will be restored to its normal position effecting reapplication of the brakes at all events at the expiration of a certain uniform interval of time following the reduction of the pressure in the timing volume 59 to twenty-five pounds per square inch. Application and release of the brakes may, therefore, be effected in normal fashion under the control of the operator, except that the anti-wheel sliding protective feature of the control valve mechanism will be lost, just as in the case of the "Decelostat" pilot valve being stuck in open position.

In view of the fact that the safety of the vehicle and its passengers is of paramount consideration, the fact that anti-wheel sliding protection, normally provided by the control valve device 6, is lost upon the rupture of the pilot valve pipe or the abnormal operation of the pilot valve device 10 is of secondary consideration.

Having now described our invention, what we claim as new and desire to secure by Letters Patent, is:

1. The combination of a fluid pressure controlled valve device having a normal position in which it establishes a communication through which fluid under pressure may be supplied to a fluid pressure receiving device and operative in response to a rapid reduction of the pressure in a control chamber to a different position in which the said communication is cut off and an exhaust communication is established through which fluid under pressure is released from the receiving device, a passageway through which fluid under pressure may be vented from the control chamber under the control of said valve device while in its said different position thereby to cause a continued reduction of the pressure in the control chamber to maintain the said valve device in its said different position, and valve means operatively controlled by the pressure of the fluid in the receiving device in such manner as to open said passageway so long as the pressure in said receiving device exceeds a certain value, and to close said passageway upon the reduction of the pressure in said receiving device to below said certain value to render said valve device ineffective in its said different position to continue the reduction of the pressure in the control chamber, thereby to enable restoration of the valve device to its normal position.

2. The combination of a fluid pressure controlled valve device having a normal position in which it establishes a communication through which fluid under pressure may be supplied to a fluid pressure receiving device and operative in response to a rapid reduction of the pressure in a control chamber to a different position in which the said communication is cut off and an exhaust communication is established through which fluid under pressure is released from the receiving device, a one-way valve device subject in opposing relation to the pressure in the chamber and the pressure in the receiving device and adapted to be unseated in response to a reduction of the pressure in the receiving device to cause a corresponding reduction of the pressure in the control chamber simultaneously with the reduction of the pressure in the receiving device thereby to maintain the said valve device in its said different position, and fluid pressure controlled means subject to the pressure in the receiving device and effective so long as the pressure in the receiving device exceeds a certain value to permit unseating of said one-way valve device and effective in response to a reduction of the pressure in the receiving device to below said certain value for preventing the unseating of said one-way valve device and thus the further reduction of the pressure in the control chamber under the control of the valve device, and means effective to cause charging of the control chamber of the said valve device and the consequent restoration of the valve device to its normal position when unseating of the one-way valve device is prevented by said fluid pressure controlled means.

3. The combination of a fluid pressure controlled valve device having a normal position in which it establishes a communication through which fluid under pressure may be supplied to a fluid pressure receiving device and operative in response to a rapid reduction of the pressure in a control chamber to a different position in which the said communication is cut off and an exhaust communication is established through which fluid under pressure is released from the receiving device, a one-way valve device subject in opposing relation to the pressure in the chamber and the pressure in the receiving device and adapted to be unseated in response to a reduction of the pressure in the receiving device to cause a corresponding reduction of the pressure in the control chamber simultaneously with the reduction of the pressure in the receiving device thereby to maintain the said valve device in its said different position, resilient means adapted to exert a force sufficent to prevent unseating of said one-way valve, fluid pressure responsive means subject to the pressure in the receiving device in a manner such that it renders said resilient means ineffective to prevent unseating of the said one-way valve device so long as the pressure in the receiving device exceeds a certain value and renders said resilient means effective to prevent unseating of said one-way valve device whenever the pressure in said receiving device reduces below said certain value, and means effective when said one-way valve device is reseated by said resilient means as a consequence of the reduction of the pressure in the receiving device, for so recharging the control chamber as to effect restoration of the valve device to its normal position.

4. The combination of a fluid pressure controlled valve device having a normal position in which it establishes a communication through which fluid under pressure may be supplied to a fluid pressure receiving device and operative in response to a rapid reduction of the pressure in a control chamber associated with said valve device and chargeable with fluid under pressure concurrently with the supply of fluid under pressure to the fluid pressure receiving device, said valve device being operative in response to a rapid reduction of the pressure in the control chamber to a different position in which the said supply communication is cut off and an exhaust communication is established through which fluid under pressure is released from the receiving device, a piloting communication, a chamber, means providing a restricted communication through which said piloting communication and said chamber are chargeable at a restricted rate concurrently with the supply of fluid under pressure to the receiving device, fluid pressure responsive valve means subject to the pressure of the fluid established in said chamber and operative to establish an unrestricted communication from said control chamber to said piloting communication and said chamber in response to a pressure in said chamber exceeding a certain low value whereby to cause rapid charging of said plioting communication and said chamber concurrently with the charging of said control chamber and reduction of the pressure in said control chamber at a rapid rate upon venting of said piloting communication.

5. The combination of a fluid pressure controlled valve device having a normal position in which it establishes a communication through which fluid under pressure may be supplied to a fluid pressure receiving device, a control chamber associated with said valve device and chargeable with fluid under pressure concurrently with the supply of fluid under pressure to the fluid pressure receiving device, said valve device being operative in response to a rapid reduction of the pressure in said control chamber to a different position in which it cuts off said supply communication and establishes an exhaust communication through which fluid under pressure is released from the receiving device, a piloting communication chargeable concurrently with said control chamber and adapted to have the pressure therein reduced at a rapid rate, a chamber chargeable concurrently with said piloting communication, fluid pressure operated valve means responsive to a pressure in said chamber exceeding a certain value for establishing an unrestricted communication between said control chamber and said piloting communication whereby said piloting communication is charged at a rapid rate and whereby reduction of the pressure in the piloting communication at a rapid rate results in reduction of the pressure in the control chamber at a corresponding rate, said valve means being effective to cut off said unrestricted communication upon the reduction of the pressure in the said chamber below said certain value to cause restoration of the valve device to its normal position, and means for effecting reduction of the pressure in said chamber in response to a reduction of the pressure in said piloting communication.

6. The combination of a fluid pressure controlled valve device having a normal position in which it establishes a communication through which fluid under pressure may be supplied to a fluid pressure receiving device, a control chamber associated with said valve device and chargeable with fluid under pressure concurrently with the supply of fluid under pressure to the fluid pressure receiving device, said valve device being operative in response to a rapid reduction of the pressure in said control chamber to a different position in which it cuts off said supply communication and establishes an exhaust communication through which fluid under pressure is released from the receiving device, a piloting communication, means providing an unrestricted communication between said piloting communication and said control chamber whereby said piloting communication may be charged at a rate corresponding to the rate of charging of said control chamber and whereby upon a rapid reduction of the pressure in said piloting communication a correspondingly rapid rate of reduction of the pressure in said control chamber is effected, a timing chamber, a first check valve device interposed between the piloting communication and the timing chamber adapted to permit rapid charging of said timing chamber in correspondence with the charging of said piloting communication, a second check valve device interposed between said timing chamber and said piloting communication adapted to permit the flow of fluid under pressure therepast from the timing chamber to the piloting communication upon a reduction of the pressure in the piloting communication only so long as the pressure in the timing chamber exceeds a certain uniform pressure, means effective at all times to cause reduction of the pressure in the timing chamber at a restricted rate concurrently with the reduction of the pressure in the piloting communication at a rapid rate, and fluid pressure operated valve means responsive to a reduction of the pressure in the timing chamber to below a certain low value for closing the unrestricted communication between said piloting communication and said control chamber whereby to enable the recharging of the control chamber and the consequent restoration of the said valve device to its normal position upon the expiration of a certain uniform time following the reduction of the pressure in the timing chamber to below said certain uniform pressure.

7. The combination of a fluid pressure controlled valve device having a normal position in which it establishes a communication through which fluid under pressure may be supplied to a fluid pressure receiving device, a control chamber associated with said valve device and chargeable with fluid under pressure concurrently with the supply of fluid under pressure to the fluid pressure receiving device, said valve device being operative in response to a reduction of the pressure in the control chamber at a rapid rate to a different position in which the said supply communication is cut off and an exhaust communication is established through which fluid under pressure is released from the receiving device, a piloting communication, means providing an unrestricted communication between the piloting communication and the control chamber whereby said piloting communication is charged according to the pressure in the control chamber and whereby reduction of the pressure in the control chamber at a rapid rate is effected in response to the rapid reduction of the pressure in the piloting communication, a cut-off valve device adapted to permit fluid under pressure to be vented therepast from the control chamber while the said valve device is in its said different position thereby to continue the reduction of the pressure in the control chamber and maintain the valve device in its said different position so long as the pressure in the fluid pressure receiving device exceeds a certain value, said cut-off valve device being effective to prevent the reduction of fluid under pressure in the control chamber under the control of the valve device when the pressure of fluid in the said receiving device reduces to below said certain value thereby to cause charging of the control chamber and the consequent restoration of the valve device to its said normal position if the reduction of the pressure in the piloting communication is previously terminated, valve means for closing the unrestricted communication between the piloting communication and the control chamber to prevent reduction of the pressure in the control chamber notwithstanding the continued reduction of the pressure in the piloting communication, a timing chamber, means for causing charging of said timing chamber concurrently with the charging of said piloting communication, means for effecting a reduction of the pressure in the timing chamber at a relatively rapid rate so long as the pressure in the timing chamber exceeds a certain uniform value and thereafter effective to cause reduction of the pressure in the timing chamber at a relatively restricted rate, and means responsive to the reduction of the pressure in the timing chamber to a certain low value for effecting operation of the said valve means to close the unrestricted communication between the piloting communication and the control chamber thereby to cause charging of the control chamber and the consequent restoration of the valve device to its normal position in the event that reduction of the pressure in the piloting communication continues after said cut-off valve device becomes effective to prevent further reduction of the pressure in the control chamber under the control of the valve device.

GLENN T. McCLURE.
JOHN W. RUSH.

REFERENCES CITED

The following references are of record in the file of this patent:

UNITED STATES PATENTS

| Number | Name | Date |
| --- | --- | --- |
| 2,417,209 | McCune | Mar. 11, 1947 |
| 2,417,211 | Newell | Mar. 11, 1947 |